Nov. 15, 1927.  1,649,138

C. R. SODERBERG

BALANCING MACHINE

Filed Feb. 3, 1923  3 Sheets-Sheet 1

WITNESSES:

INVENTOR
Carl Richard Soderberg
BY
ATTORNEY

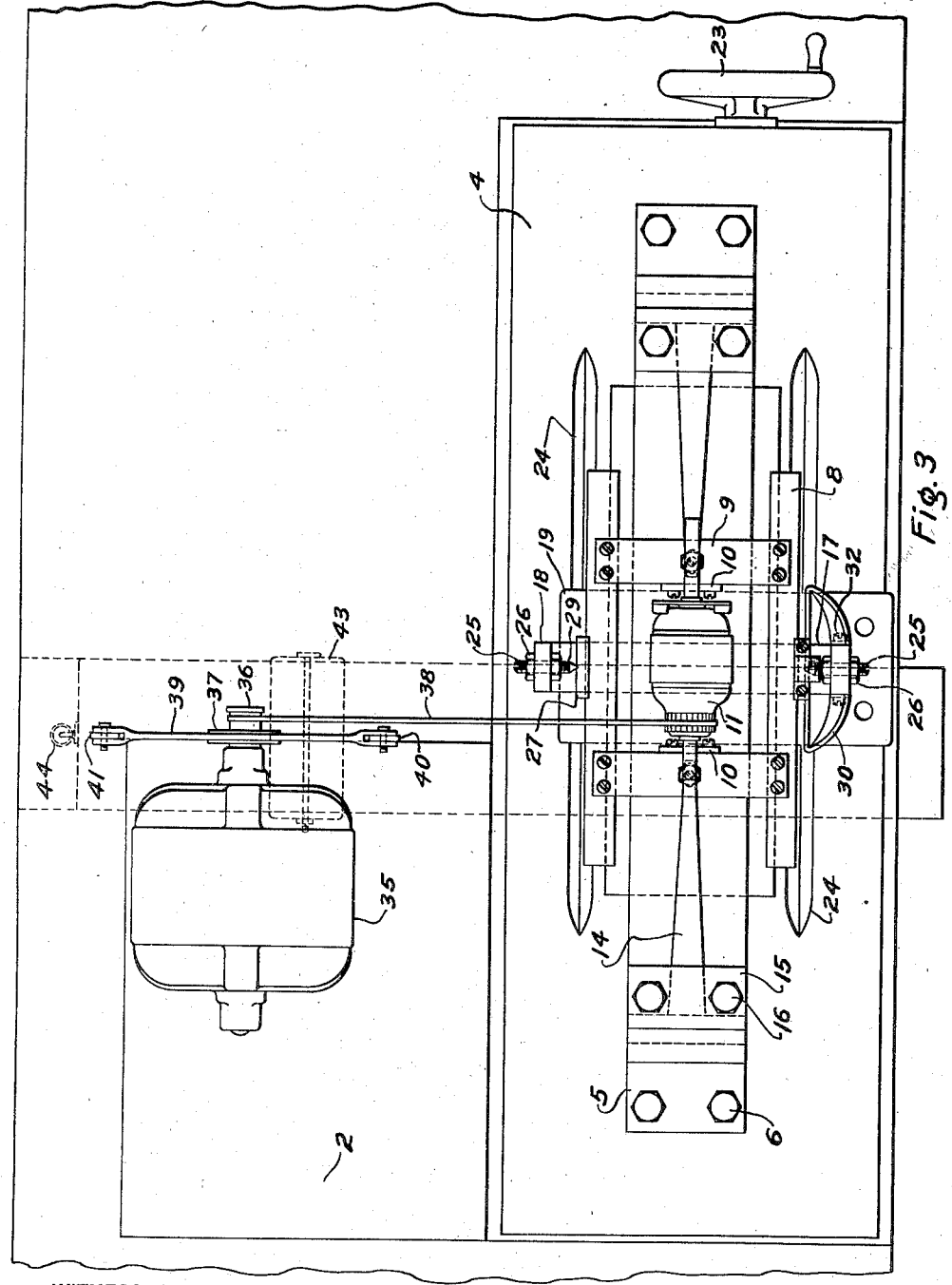

Patented Nov. 15, 1927.

1,649,138

UNITED STATES PATENT OFFICE.

CARL RICHARD SODERBERG, OF EDGEWOOD, PENNSYLVANIA, ASSIGNOR TO WESTINGHOUSE ELECTRIC & MANUFACTURING COMPANY, A CORPORATION OF PENNSYLVANIA.

BALANCING MACHINE.

Application filed February 3, 1923. Serial No. 616,713.

My invention relates to balancing machines, more especially to machines adapted to indicate the unbalance of rotors, such as armatures and the like.

It is among the objects of my invention to provide a device that is especially adapted to the balancing of small rotors such as are employed in high-speed motors, my device being particularly adapted to accurately test such rotors in production quantities in an expedient and inexpensive manner.

It is a further object of this invention to provide a mechanism that shall be sensitive to the relatively small unbalanced masses occuring in rotors of comparatively small mass in themselves and that shall be adapted to indicate the degree of such unbalance.

In my copending application, Serial No. 593,732, filed Oct. 11, 1922, and assigned to the Westinghouse Electric & Manufacturing Company, I have illustrated and described a balancing machine embodying a vertically oscillating bed secured, by a plurality of spring members, to a stationary support and having a movable fulcrum member interposed therebetween, the bed having the same natural period of vibration for any location of the fulcrum. Such a machine is capable of indicating the degree of unbalance of a rotor mounted upon the oscillatory bed and the angular location of such unbalance relative to the static plane.

As set forth in the specification, the device is adapted to the testing of small rotors and represents a decided improvement over prior types by its simplicity of construction and operation and in that it is capable of indicating the unbalance to a finer degree and with greater accuracy.

My present invention is directed to a device embodying the principles of the above-mentioned apparatus with greater refinement of the operating mechanism to adapt it more readily to the testing of very small rotors on a commercial basis.

In the accompanying drawings constituting a part hereof and in which like reference characters designate like parts, Figure 1 is a front elevational view of a balancing machine embodying the principles of this invention;

Fig. 3 is a plan view showing the general arrangement of the several co-operating parts.

Figure 1:
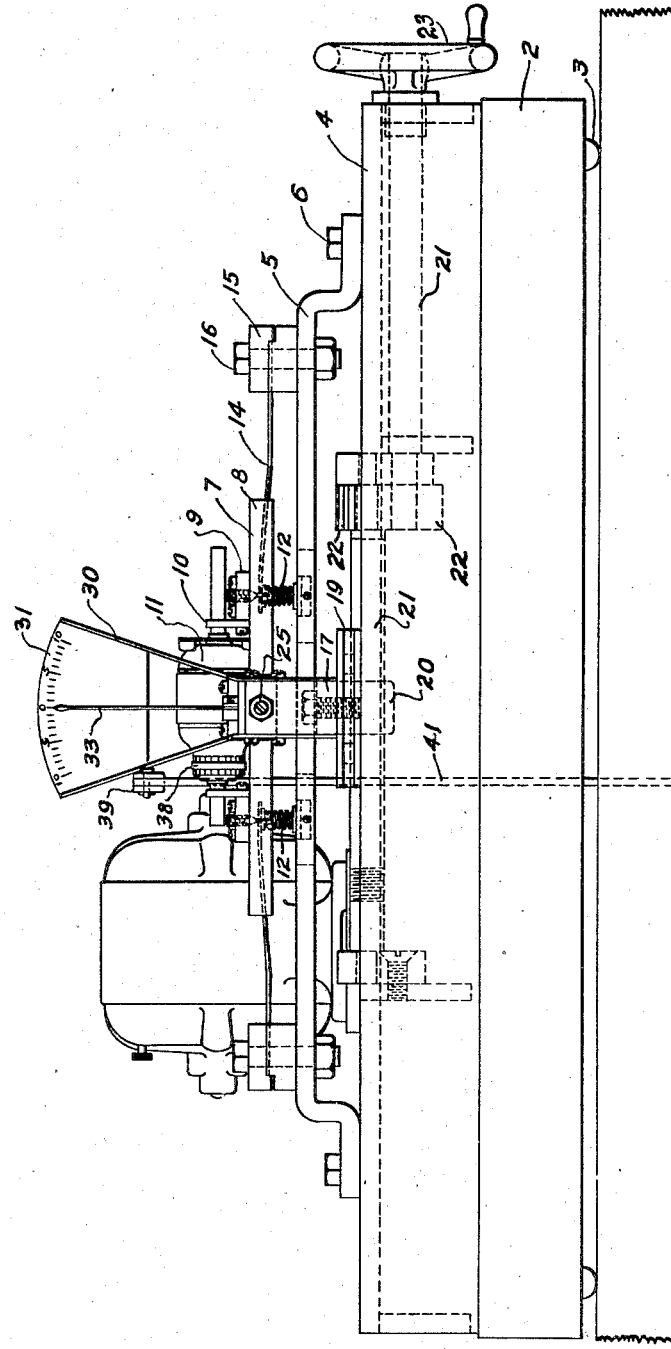

Referring to Fig. 1, the apparatus therein illustrated comprises a base 1, a supporting member 2 mounted thereon, by a plurality of bosses 3, to obtain accurate seating and alinement thereof. A casting or structural member 4, composed of channel bars and the like, is secured to the support 2 and is provided with a projecting support 5, which is secured thereto by a plurality of bolts 6. A bed 7, comprising a pair of longitudinal strips 8, having tie rods 9, which are provided with a plurality of journal bearings 10, adapted to rotatably mount a rotor, such as an armature of a motor 11, is mounted by a plurality of helical spring members 12 upon the projecting support 5. A pair of flexible members 14, such as metal straps, are secured at their ends to clamping brackets 15 and the bed 7, respectively, to restrain lateral movement of the bed 7 and permit of vertical or oscillatory movement thereof. The clamping brackets 15 are secured to the ways 5 by a clamping bolt 16.

Figure 2:
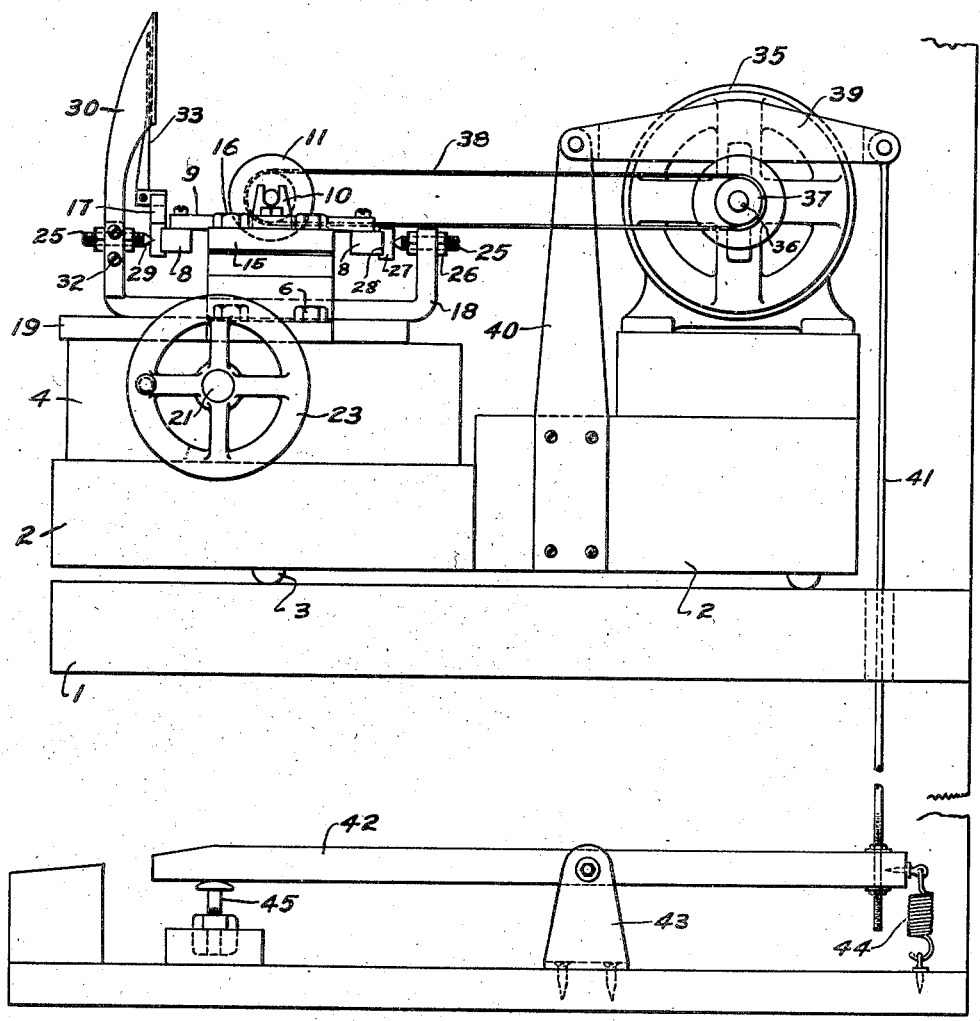
Fig. 2 is a side elevational view thereof.

A movable fulcrum 17 (Figs. 1, 2 and 3) comprises a substantially U-shape bar 18, secured to a carriage 19 having a threaded nut 20, which is in engagement with a screw shaft 21, journaled in the member 4, the shaft 21 being connected, through gears 22, to a hand wheel 23 secured at the end thereof, by which the fulcrum member 17 is moved horizontally along the movable bed 7. The carriage 19 is adapted to move longitudinally in the ways 24 of the support 4. A pair of pin-head screws 25 are secured with lock nuts 26 in the threaded openings provided in the bar 18, and a pair of rectangular slide blocks 27, having a recessed portion 28 adapted to engage the strips 8, are pivotally supported by the center points 29 of the screws 25 to provide oscillatory movement of the blocks 27 relative to the fulcrum screws. An indicating device, comprising a fan-shape base 30, having suitable graduations 31 formed thereon, is secured to one end of the bar 18 by a plurality of screws 32. An indicating reed 33 is secured on one of the slide blocks 27 to indicate the angular movement of the bed 7, affected by the unbalance of the rotor 11, when operated at suitable speeds.

A motor 35 is mounted on an extension of the support 3, having its shaft 36 in alinement with the axis of the rotor 11, and a pulley 37 is mounted on the motor shaft, by which it is connected through a belt 38 to the rotor 11 to be tested. A brake, consisting of a lever 39, pivotally mounted on a vertically extending arm 40, secured to the base 3, is provided with a vertically depending rod 41, secured to a tread 42 pivoted on a supporting bracket 43 and restrained at one end by a coil spring 44. A contact switch 45 is mounted underneath the tread 42, and the motor 35 is actuated by pressing the tread 42 by the foot of the operator, thereby releasing the brake lever 39 and closing the contact 45.

The operation of this device is briefly as follows: The rotor 11 to be tested is placed on the journal bearings 8, and the motor belt 38 is slipped around the commutator or some other convenient part of the rotor. The motor is actuated through the contact 45, and the degree of unbalance of the rotor 11 is indicated by the reed 33, which vibrates across the graduations 31. The correction for unbalance is then made on the rotor, which is again tested by rotating it on the bed 7 to determine the success of the first test. The operation is repeated until the rotor 11 is in perfect balance, which is usually accomplished by two or three trials.

The correction weights need not be applied to the rotor permanently while testing, but a plurality of graduated wedges or the like may be provided, which are inserted between the coils of the armature until the proper corrections have been made. The weights and location of these wedges are then determined and suitable markings are made, by which the rotor is then permanently balanced by addition of weights which may be done, apart from the balancing device, thereby allowing the use of the machine for testing exclusively.

It will be readily understood, from the above description of my invention, that a balancing machine made in accordance therewith is adapted to speedily and conveniently test small rotors in commercial manufacture without the need of skilled operators or complicated mathematical analysis. Such a device further makes possible the use of smaller armatures for electrical machines to operate at greater speeds, in view of the ease of balancing such a body before embodying the same in a commercial device.

Although I have described a specific embodiment of my invention, it will be obvious to those skilled in the art that various changes may be made in the details of construction. The type and location of the yielding spring members may be varied in accordance with the rate and size of the body to be tested, and the general details of design and construction may be varied to accommodate the use of the apparatus to specific manufacturing conditions. Any suitable indicating device may be substituted for the reed indicator. These and other changes may be made in the details of construction without departing from the principles herein set forth.

I claim as my invention:—

1. A balancing machine comprising a stationary support, a movable bed associated therewith, a plurality of yielding supports for said bed, a fulcrum member interposed between said bed and said support, being adapted to move longitudinally intermediate said yielding supports, an indicator carried by said fulcrum means on said bed for rotatably mounting a body to be tested, and means for actuating said body.

2. A balancing machine comprising a stationary support, a movable bed associated therewith, a plurality of yielding supports for said bed, a fulcrum member interposed between said bed and supports being adapted to move longitudinally intermediate said yielding supports, means on said bed for rotatably mounting a body to be tested, means for actuating said body, and indicating means secured to said fulcrum for determining the quantity of unbalance in the body tested.

3. A balancing machine comprising a stationary support, a pair of parallel ways mounted thereon, a vertically movable bed secured by a plurality of yielding supports on said ways, a fulcrum member movably mounted on said ways adapted to slidingly engage said bed, an indicating device secured to said fulcrum to denote the oscillatory movement of said bed, means for rotatably mounting a body to be tested on said bed, and means extrinsic of said bed for actuating said body.

4. A balancing machine comprising a stationary support, a pair of parallel ways mounted thereon, an oscillatory bed associated with said ways, a plurality of spring members connecting said bed and ways, flexible strap members secured to the respective ends of said bed and to brackets on said supporting structure, a plurality of journal brackets on said bed for rotatably mounting a rotor, a fulcrum member movably mounted on said ways and in sliding engagement with the parallel longitudinal edges of the bed, means for actuating said rotor, and means for indicating the relative degree of unbalance of said rotor.

5. A balancing machine comprising a stationary support, a pair of parallel ways mounted thereon, an oscillatory bed associated with said ways, a plurality of spring members connecting said bed and ways, flexible strap members secured to the respective ends of said bed and to brackets on said supporting structure, a plurality of journal brackets on said bed for rotatably mounting a rotor, a fulcrum member movably mounted on said ways and in sliding engagement with the parallel longitudinal edges of the bed, a motor mounted on said support having a means for actuating and stopping the rotor thereof, and means for connecting said motor to the rotor to be tested.

6. A balancing machine comprising a stationary support, an oscillatory bed mounted thereon, a movable fulcrum intermediate said bed and support, an indicating device comprising a graduated shield, an indicating reed associated with said fulcrum and bed, and means for rotatably mounting a rotor to be balanced on said bed.

In testimony whereof, I have hereunto subscribed my name this 25th day of January, 1923.

CARL RICHARD SODERBERG.